US006895551B1

(12) United States Patent
Huang et al.

(10) Patent No.: US 6,895,551 B1
(45) Date of Patent: May 17, 2005

(54) NETWORK QUALITY CONTROL SYSTEM FOR AUTOMATIC VALIDATION OF WEB PAGES AND NOTIFICATION OF AUTHOR

(75) Inventors: Anita Wai-Ling Huang, Oakland, CA (US); Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/404,421

(22) Filed: Sep. 23, 1999

(51) Int. Cl.$^7$ .................. G06F 15/00; G06F 15/173
(52) U.S. Cl. .................. 715/513; 715/530; 707/3; 709/223; 717/124
(58) Field of Search ................ 715/513, 530; 709/223; 717/124; 707/3

(56) References Cited

U.S. PATENT DOCUMENTS

| | | | |
|---|---|---|---|
| 5,355,479 A | 10/1994 | Torii et al. .................. 395/600 |
| 5,557,720 A | 9/1996 | Brown, Jr. et al. ......... 395/146 |
| 5,745,360 A | 4/1998 | Leone et al. ................ 364/140 |
| 5,802,299 A | 9/1998 | Logan et al. ........... 395/200.48 |
| 5,870,559 A | 2/1999 | Leshe et al. ........... 395/200.54 |
| 5,898,836 A | 4/1999 | Freivald et al. ........ 395/200.48 |
| 5,907,621 A | 5/1999 | Bachman et al. ............. 380/25 |
| 5,907,705 A | 5/1999 | Carter .......................... 395/701 |
| 6,151,624 A * | 11/2000 | Teare et al. .................. 709/217 |
| 6,219,676 B1 * | 4/2001 | Reiner ......................... 707/201 |
| 6,253,204 B1 * | 6/2001 | Glass et al. ................. 707/102 |
| 6,256,773 B1 * | 7/2001 | Bowman-Amuah ......... 717/121 |
| 6,269,370 B1 * | 7/2001 | Kirsch ......................... 707/10 |
| 6,292,894 B1 * | 9/2001 | Chipman et al. ........... 713/168 |
| 6,516,337 B1 * | 2/2003 | Tripp et al. ................. 709/202 |

OTHER PUBLICATIONS

"Validators and Document Checkers", Web Design Group, 1997.*
"Doctor HTML Test Explanation", 1998. Available at: http://www.webarchive.org/web/19990508183028/www2.imagiware.com/RxHTML/htdoxs/Explanations.*
Balasubramanian, V. and Alf Bashian, "Document Management and Web Technologies: Alice Marries the Mad Hatter". Jul. 1998.*

(Continued)

Primary Examiner—Sanjiv Shah
Assistant Examiner—Rachna Singh
(74) Attorney, Agent, or Firm—Samuel A. Kassatly

(57) ABSTRACT

A computer program product is provided as a network quality control system to perform an automatic validation of all the World Wide Web pages. The quality control system aims at improving the quality of the World Wide Web by promoting widely accepted uniform standards such as HTML, and further by generating web documents that are valid and compliant with the standards according to which they are published. The quality control system actively seeks malformed web pages and corrects them in conformity with their publication standards. The quality control system also automatically determines the most probable addresses of the persons in charge of maintaining the non-conformant web documents using a probabilistic approach, notifies these persons of the non-conformity of their documents, and forwards the corrected web documents to their attention.

30 Claims, 3 Drawing Sheets

OTHER PUBLICATIONS

Fielding, Roy, "MOMspider Multi–Owner Maintenance Spider", 1994.*

Selected web pages from http://www2.imagiware.com/web site, Aug. 30, 1999.

Web page: http://www.w3.org/People/Raggett/tidy, Aug. 30, 1999.

Web page: wysiwyg://158/http://www.websitegarage.com/o=wsg/webmaster/index.html, Jun. 15, 1999.

Web page: http://www.weblint.org/www5–paper.html, Aug. 30, 1999.

Web page: http://www.weblint.org/validation.html, Aug. 30, 1999.

Web page: http://watson.addy.com, Aug. 30, 1999.

Web page: http://www.submit4less.com/new.htm, Aug. 30, 1999.

Web page: http://www.netmechanic.com./html_check.htm, Aug. 30, 1999.

Web page: http://transend.labs.bt.com/spot/, Jun. 15, 1999.

* cited by examiner

NETWORK QUALITY CONTROL SYSTEM FOR AUTOMATIC VALIDATION OF WEB PAGES AND NOTIFICATION OF AUTHOR

BACKGROUND OF THE INVENTION

1. Field of the Invention

The present invention relates to a network quality control system that performs an automatic validation of World Wide Web pages and other hypertext documents. Particularly, the present invention relates to a software system and associated method for the automatic validation and repair of web pages, the automatic identification of web page authors using a probabilistic approach, and the automatic notification to the web page authors of the structural errors in their web pages.

2. Description of Related Art

The World Wide Web (WWW) is an open communications network where computer users can access available data, digitally encoded documents, books, pictures, and sounds. WWW (or web) documents are traversed in segments related to one another using hypertext links otherwise known as "links". Hypertext links allow a user to view available digitally encoded document information in a non-sequential manner. Using hypertext links the user can jump from one location in a document to another location, document, or web site.

With the explosive growth of the WWW, users increasingly create their own web pages without resorting to professional assistance. As a result, the number of web authors who lack familiarity with WWW standard language specifications also increases. These web authors are often unaware of the importance of producing valid documents or even of the existence of standard WWW specifications (such as the language specifications for HTML). Hence, a significant number of HTML pages on the WWW do not conform to the published standards (refer for example to the following site http://www.w3.org). These documents contain structural errors. A few exemplary factors that contribute to the introduction of errors in the creation of web pages are listed below:

Most web browsers are very forgiving of malformed HTML documents and attempt to render pages regardless of how badly formed they are. These browsers compensate for errors according to their own methods. As a result, viewed through one type of web browser, structurally erroneous HTML documents may appear to achieve the web author's design goals even while not adhering to standard specifications.

An increasing number of web authors use visual tools to automatically generate HTML documents. As a result, the extent to which the document complies with HTML standards depends on the quality of the tool. Unfortunately, these tools range in quality, and many do not adhere to the standard specifications. Moreover, as HTML specifications evolve over time, outdated versions of tools will generate documents using deprecated and hence non-valid HTML features.

Consequently, a significant number of published web documents contain HTML errors. The pervasiveness of such structural errors in HTML documents limits the utility and versatility of the data contained within them. These structural errors preclude valuable content information from being properly processed by web agents and thereby pose barriers that limit web accessibility. For example, user agents, such as specialized voice browsers for the blind, often cannot adequately parse malformed HTML documents. As a result, they might be unable to properly render these documents for blind users. Similarly, data extraction agents, such as those used by search engines to index web documents, often cannot fully access and process valuable content and metadata information in malformed HTML documents. As a result, the search engines could fail to index the pages optimally. These problems of access are particularly troublesome to web site owners or companies that rely on their web sites to provide critical information and services to customers and business partners.

In an effort to address the problem and to promote the valid use of the HTML in web documents, several methods and systems were proposed and are made available, for example, at the following WWW sites:

http://netmechanic.com;

http://websitegarage.com;

http://www2.imagiware.com/RxHTML;

http://www.w3.org/People/Raggett/tidy;

http://www.submit4less.com; and http://watson.addy.com.

However, these HTML validating services require web authors to have a priori knowledge of the existence of, and the value of adherence to the published standards. None of the conventional validation services proactively seeks out malformed web pages over the entire WWW. For web authors to test their documents using these services, the authors must either register their web sites directly with the services or submit each URL manually. Hence, the web authors who lack knowledge of the importance of valid HTML are likely not to use these validation services. As a result, the majority of published HTML documents that contain structural errors will remain erroneous indefinitely without the authors' awareness.

There is therefore a great and still unsatisfied need for a network quality control system that proactively performs an automatic validation of the documents on the WWW, that automatically repairs non-conformant web pages, and that automatically finds the authors and notifies them of errors in their documents.

SUMMARY OF THE INVENTION

In accordance with the present invention, a computer program product is provided as a network quality control system to perform an automatic validation of a significant portion, if not all the World Wide Web pages. The quality control system aims at improving web quality by proactively validating web documents against one or more of the accepted specifications, such as that for HTML, and further by repairing the documents to make them valid and compliant with the desired standard specifications pursuant to which they are published.

The quality control system achieves this feature by actively seeking out malformed hypertext documents and correcting them in conformity with accepted standard specifications. The quality control system also automatically determines the most probable links (such as the e-mail addresses) to the persons in charge of maintaining the documents using a probabilistic approach, notifies these persons of the non-conformity of their documents, and forwards the corrected documents to their attention.

In a preferred embodiment, the computer program product includes a web site scanning routine that uses conventional or available webcrawling techniques to gather hypertext documents (i.e., HTML documents, XML documents, etc.) to be tested for document validity.

A validation module identifies the hypertext standard (i.e., HTML, XML, etc.) used by the hypertext documents, and automatically tests the validity of the hypertext documents for compliance with the identified standard, by parsing the hypertext documents and by identifying problems it encounters. If a hypertext document fails the parse, the hypertext document is classified as non-conformant; otherwise, the hypertext document is classified as conformant. The validation module also extracts and stores in a relational database metadata to be used by other modules from the conformant and non-conformant documents.

Exemplary metadata found within each document include a listing of errors if the document is non-conformant, the addresses of the links to other web sites or pages, and the addresses and annotations of the links that are email addresses ("mailto" links).

A repair module automatically corrects non-conformant hypertext documents by passing them through an editor (also referred to as repair tool or filter) corresponding to the hypertext standard identified by the validation module, by revising non-conformant elements in the hypertext documents. In a preferred embodiment, the editor is a HyperText Markup Language (HTML) editor, and the validation module includes a HTML parser that parses HTML documents. According to another embodiment, the validation module includes a XML parser that parses XML documents. The repair module stores repair information in the database.

An author search module automatically determines the most probable reply link for the hypertext documents using a probabilistic prediction approach. The author search module searches the database for information that explicitly specifies the author contact information for the hypertext document. Exemplary ways that allow for contact information to be made explicit and highly probable include the following:

The web author has manually registered the page and has provided contact information in the form of an email address.

There exists a "mailto" link within the web site containing the page that points to an email address that begins with "webmaster@".

The author search module has, in a previous run, already determined with high confidence the most probable webmaster link and recorded it in the database.

If no explicit information exists for a particular web site, the author search module performs a probabilistic analysis of all predetermined "mailto" links contained within the hypertext documents in the web site. The author search module computes and assigns a probability-based score to each of these out-links by comparison with the metadata of known web author "mailto" links in a representative sample set using lexical and site structure analyses. Once the author search module determines the most probable reply link, it records it in the database, and a notification module sends a notice and the revised documents that were generated by the repair module to the reply link.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items.

DETAILED DESCRIPTION OF THE PREFERRED EMBODIMENTS

Figure 1:
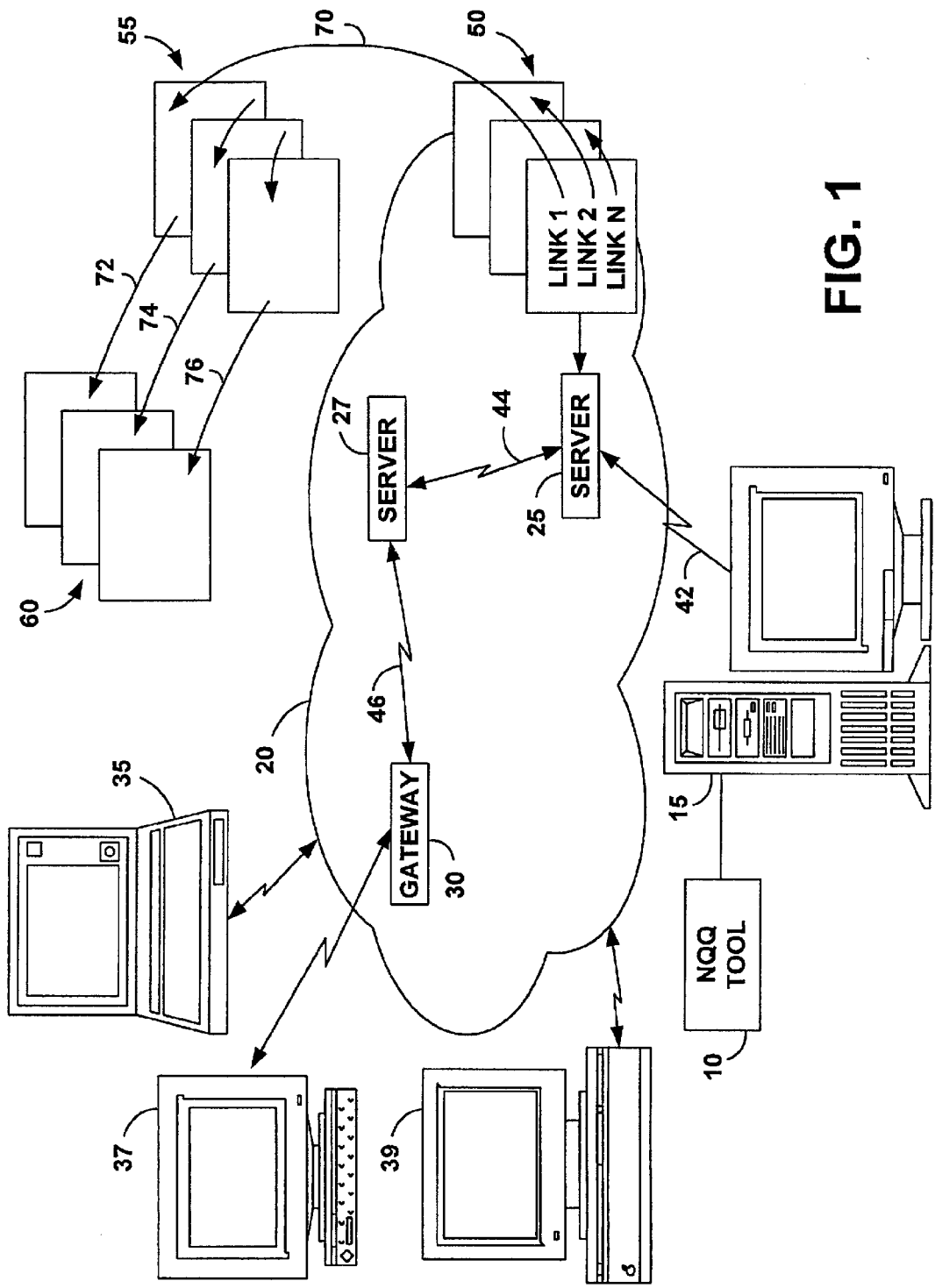
FIG. 1 is a schematic illustration of an exemplary overall operating environment of the present invention in which users communicate over the World Wide Web (WWW) to access electronically stored HTML documents.

The following definitions and explanations provide background information pertaining to the technical field of the present invention, and are intended to facilitate the understanding of the present invention without limiting its scope:

World Wide Web (WWW): An Internet client—server hypertext distributed information retrieval system.

Hypertext System: A computer-based informational system in which documents (and possibly other types of data entities) are linked together via hypertext links to form a user-navigable web.

Hypertext Link (or hyperlink): A reference link from some point in one hypertext document to another point in another document or another place in the same document. When a user activates the link (e.g. by clicking on it with the mouse) the browser will display the destination of the link.

Internet: A collection of interconnected public and private computer networks that are linked together with routers by a set of standards protocols to form a global, distributed network.

Crawler or spider: A program that automatically explores the World Wide Web by retrieving a document and recursively retrieving some or all the documents that are linked to it.

Web Site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

Web browser: A software program that allows users to request and read hypertext documents. The browser gives some means of viewing the contents of web documents and of navigating from one document to another.

Web server: A software program or a computer that responds to requests from a web browser by returning ("serving") web documents.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

HTML (Hypertext Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

XML (Extensible Markup Language): A meta-language that provides a framework (or set of rules) to specify domain specific languages. Sometimes described as a simplified dialect of SGML suitable for use on the Word-Wide Web, it gives rise to such markup languages as SMIL (Synchronized Multimedia Integration Language), CML (Chemical Markup Language), MML (Mathematics Markup Language), etc.

SGML (Standard Generalized Markup Language): A generic markup language for representing documents. SGML is an International Standard that describes the relationship between a document's content and its structure. SGML allows document-based information to be shared and re-used across applications and computer platforms in an open, vendor-neutral format. SGML is defined in "ISO 8879:1986 Information processing—Text and office systems—Standard Generalized Markup Language (SGML)", an ISO standard produced by JTC 1/SC 18 and amended by "Amendment 1:1988".

URL (Uniform Resource Locator): A unique address which fully specifies the location of a content object on the Internet. The general format of a URL is protocol://server-address/path/filename.

URI (Uniform Resource Identifier): The method by which any content object on the Internet is identified. A URL is one type of URI.

HTTP (Hypertext Transfer Protocol): Standard WWW client-server protocol used for the exchange of information (such as HTML documents, and client requests for such documents) between a web browser and a web server. HTTP includes several different types of messages that can be sent from the client to the server to request different types of server actions.

Gateway: A standard interface that specifies how a web server launches and interacts with external programs (such as a database search engine) in response to requests from clients.

"Mailto" Link: A hyperlink element consisting of a URI referring to a user's mailbox. An example "mailto" link is the following HTML anchor element:

<A href="mailto:webmaster@someplace.com">webmaster</A>

FIG. 1 portrays the overall environment where a network quality control system (NQQ) 10 according to the present invention can be used. The NQQ control system 10 includes a software or computer program product which is typically embedded within, or installed on a host server 15. Alternatively, the NQQ 10 can be saved on a suitable storage medium such as a diskette, a CD, a hard drive, or like devices. The cloud-like communication network 20 is comprised of communication lines and switches connecting servers such as servers 25, 27, to gateways such as gateway 30. The servers 25, 27 and the gateway 30 provide the communication access to the WWW Internet. Remote Internet users are represented by a variety of computers such as computers 35, 37, 39.

The host server 15 is connected to the network 20 via a communications link such as a telephone, cable, or satellite link. The servers 25, 27 can be connected via high speed Internet network lines 44, 46 to other computers and gateways. The servers 25, 27 provide access to stored information such as hypertext documents indicated generally at 50, 55, 60. The hypertext documents 50, 55, 60 most likely include embedded hypertext links such as LINKs 2 and N to other locally stored pages, and hypertext links such as LINK 1 and links 70, 72, 74, 76 to other webs sites or documents 55, 60 that are stored by various web servers such as the server 27.

The NQQ system 10 will now be described in more detail with further reference to FIG. 2. The NQQ system 10 includes a computer program product such as a software package, which is generally comprised of five modules (also referred to as routines): a crawling module 100, a validation module 105, a repair module 110, an author search module 115, and a notification module 120.

In a preferred embodiment, the crawling module 100 includes several crawlers that aim to visit and download every page on the WWW (exemplified in FIG. 2 as server 25) at periodic intervals, for example about once a month, without subscription or registration of the URLs of the pages (or web sites) by the web authors. During a visit to a web page specified by a URL, a crawler downloads the content at the URL and transmits the content as input to the validation module 105. It records the visit information for the URL in a database and obtains from the database the next URL to visit from a list of URLs to visit. Exemplary visit information for a URL includes time visited, errors encountered during download, etc. The list of URLs to visit originate from the URLs of the links to other web pages and web sites within each visited document, such as such as LINKS 1, 2, N, 70, 72, 74, 76 (FIG. 1), that are extracted and entered into the relational database by a validation module 105.

The validation module 105 identifies the specific hypertext standard used by the downloaded web page, and automatically validates this web page by testing it for compliance with the identified hypertext standard. The validation module 105 parses the web page and identifies all the problems it encounters in the parsing process. It enters this list of errors (and recommendations for repair) into the database for use by a repair module. While parsing the document, the validation module 105 also extracts the URLs of the links within the document to other web sites and enters these links into the relational database for access by the crawling module 100. Additionally, the validation module 105 extracts the metadata of, and annotations for all the "mailto" links within the document and enters this information into the relational database for analysis by an author search module 115.

The first two columns in the following Table 1 illustrate exemplary HTML errors detected by the validation module 105.

TABLE 1

Examples of HTML Repairs

| Error-type | Non-valid HTML | Repaired HTML |
| --- | --- | --- |
| Missing end tags. | <p>First paragraph <p>Second paragraph | <p>First paragraph. </p> <p>Second paragraph. </p> |
| Mismatched or unknown tags | <h>An unknown header tag</h1> | <h1>An unknown header tag</h1> |

TABLE 1-continued

Examples of HTML Repairs

| Error-type | Non-valid HTML | Repaired HTML |
|---|---|---|
| Tags out of order | <a href="foo"><br><i>out-of-order tags</a></i> | <a href="foo"><br><i> out-of-order tags </i></a> |
| Missing "/" or ">" | <a href="foo">unclosed anchor </a dangling words | <a href="foo">unclosed anchor</a> dangling words |
| Omission of required elements | <HTML><br>Some kind of text<br></HTML> | <HTML><br><HEAD><br><title>Required</title><br></HEAD><br><BODY>Some kind of text</BODY><br></HTML> |

Though a preferred embodiment of the present invention is described in relation to a HyperText Markup Language (HTML) standard, it should be clear that the same or equivalent routines or modules incorporated in the computer program product can be used to validate other hypertext languages, such as XML or SGML.

For example, the validation module 105 can use an XML parser that adheres to W3C recommendations. If the web page fails the parse, it is classified as non-valid (or non-conformant); otherwise, it is classified as valid (or conformant). The validation module 105 is also extensible to test whether or not an XML document is well-formed, which involves downloading the web page Document Type Definition (DTD) to validate the page against it. If the validation module 105 classifies a page as non-valid, it transmits the information and page to the repair module.

The repair module 110 is an editor that automatically corrects HTML (XML, or other hypertext) pages determined by the validation module 105 to be non-valid. For every page that is not valid, the repair module 110 passes the page through an HTML editor that modifies non-conformant elements in the page to make them conform to the HTML-language specifications (as illustrated in the third column in Table I). For example, the repair module 110 repairs mismatched and missing tags, and other non-conformities (such as those listed in Table I) in a document without explicit request from the web author. The repair module 110 uses the list of errors (and recommendations) in the database 130 generated by the validation module 105 to aid in the reparation of the page. Once the repair module 110 fixes a page, it stores the corrected page and the correction information in the database 130 along with the page URL.

For each malformed HTML page, the author search module 115 attempts to identify the most probable contact information (email address) for the author of the malformed page. The author search module 115 performs this task by using a probabilistic prediction approach to determine the contact information of the webmaster (i.e., the email of the webmaster) of the web site containing the malformed page. The probabilistic algorithm uses heuristic criteria based on lexical and structural analyses of metadata from a set of known webmaster "mailto" links within a set of known web sites. It uses these criteria to analyze the metadata of the "mailto" links within the web site that contains the malformed document. Through this analysis, the module determines the probability of each "mailto" link being that of the email address of the webmaster of the site.

In one embodiment, the author search module 115 begins by searching the database 130 for information that explicitly specifies the author information of a web document. Examples of explicit contact information are as follows:

Email addresses explicitly registered by the web authors as contact information for specific web pages (or sites) and recorded in the database 130.

Email addresses on web pages (or sites) that begin with the string "webmaster@."

Email addresses that have been previously discovered (with high confidence) by the author search module and recorded in the database 130.

If the author search module 115 fails to find explicit author contact information for the malformed document in the database 130, it performs a probabilistic analysis of each of the "mailto" links extracted from all the web pages in the document's web site. The author search module 115 bases this strategy on the probability that the web author of a specific URL are the same for other URLs in the same cluster (or website). Hence, to determine the author's email for each URL, the author search module 115 groups the URLs into clusters, mainly according to the host-name. It then assigns a rank to each email address associated with the cluster. The rank depends on the heuristics based on lexical and structural comparisons with a known set of representative web sites and the "mailto" links associated with them.

As criteria for comparison, the author search module 115 uses the metadata of each "mailto" link in the cluster. It performs lexical and structural analyses on the annotations and positions of these links within the site. It computes a probability score by comparing this metadata to the metadata of the sample set.

The following are some probability factors used by the author search module 115 in analyzing the metadata:

The frequency of occurrence of words and phrases in the hyperlink annotations of webmaster "mailto" links (i.e., anchor-text, surrounding text, etc.). For example, if statistical analysis shows that links beginning with "webmaster@" or annotated with "Send comments to webmaster" or like annotations are webmaster links in about 98% of all cases, the author search module 115 assigns a corresponding weight to a link that contains these annotations.

The frequency of occurrence of words and phrases in the title, description or keyword metadata of the page containing the webmaster "mailto" link. For example, if statistical analysis shows that links found in pages entitled "Contact us" or like titles are webmaster links in about 50% of all cases, the author search module 115 assigns a corresponding weight to a link that appears in such a page.

The distribution of depth from the web site home page of the pages containing the webmaster "mailto" link. For example, if statistical analysis shows that "mailto" links found in pages at a depth 3 away from the home page are webmaster links 40% of all cases, the author search module 115 assigns a corresponding weight to a link appearing at this depth.

After scoring each "mailto" link, the author search module 115 chooses the link or email with the highest rank. If the score exceeds a predetermined threshold value, the author search module 115 infers that the link leads to the webmaster of the site and/or the author of the page, and records it in the database 130 along with the URLs of the site.

In the following simplified exemplary embodiment, the probabilistic analysis of the metadata is based on the probability distribution of webmaster links over a hypothetical sample set of 1000 known HTML pages comprising 100 known web sites and 100 known webmaster links as follows:

Within the 1000 web pages crawled, 500 "mailto" links are found.

Of the 500 "mailto" links, 100 actual webmaster links are found.

The anchor text of a "mailto" link in an HTML document refers to the text within the anchor tags: i.e., <a href="mailto:webmaster@somewhere.com">anchor text</a>

The depth of a "mailto" link refers to the distance away from the homepage of the page containing the "mailto" link In the sample set, the following hypothetical frequency distributions are found for the anchor text and depths of the "mailto" links, where:

total=total number of "mailto" links;
hits=total number webmaster links;
probability=hits/total.

TABLE 2

Anchor information for the "mailto" links of 100 known sites

| anchor text | total | hits | probability |
|---|---|---|---|
| "webmaster" | 50 | 50 | 100% |
| "feedback" | 25 | 25 | 10% |
| "contact us" | 100 | 10 | 10% |
| "send comments" | 100 | 10 | 10% |
| other | 125 | 5 | 4% |

TABLE 3

Distance information for the "mailto" links of 100 known sites

| depth | total | hits | probability |
|---|---|---|---|
| 0 | 100 | 25 | 25% |
| 1 | 100 | 50 | 50% |
| 2 | 100 | 25 | 25% |
| 3 | 100 | 0 | 0 |
| 4 | 100 | 0 | 0 |

In this hypothetical embodiment, a malformed web page is found within a web site from which 3 "mailto" links are extracted: A, B, and C. The anchor-text and depth metadata for these links are recorded in the database 130 as follows:

TABLE 4

Metadata for "mailto" links of 1 unknown site

| link | anchor text | depth |
|---|---|---|
| A | "send comments" | 0 |
| B | "webmaster" | 1 |
| C | "john doe" | 2 |

In order to ranking the links according to their probability of being author contact links, the author search module computes a weight based on the statistics in Table 2 and Table 3. For example, based on probability analysis of anchor text alone, the module computes probability scores as in the second column of Table 5 below. Since 10% of all "mailto" links with anchor-text equals "send comments" were found in the sample set to be webmaster links, the module predicts that link A has a 10% probability of being a webmaster link, etc. Based on the probability analysis depth alone, the author search module 115 computes probability scores as in the third column of Table 5. Since 25% of all "mailto" links at depth 0 were found in the sample set to be webmaster links, the module predicts that link A has a 25% probability of being a webmaster link, etc. Taking all the criteria into account, the author search module 115 uses a hybrid probability metric as in the third column of Table 5. This metric assigns weights that reflect the confidence that the module has for each criteria type. For example, the search module might place 90% confidence in anchor-text being an accurate indicator of probability compared to 10% confidence in depth. In this case, it might compute the probability scores as in the fourth column of Table 5.

TABLE 5

Probability scores for "mailto" links

| link | p(anchor-text) | p(depth) | p(anchor-text, depth) | p(90, 100) |
|---|---|---|---|---|
| A | 10% | 25% | 10a + 25d | 11.5% |
| B | 100% | 50% | 100a + 50d | 90.5% |
| C | 10% | 25% | 10a + 25d | 3.9% |

Using this hybrid metric, the author search module 115 determines that link B is most likely the webmaster link and records it in the database 130.

The hypothetical exemplary embodiment described is simplistic for reasons of clarification. It should be clear that more involved probability computations and heuristics that take into account anchor-depth occurrence, frequencies, etc. would be incorporated in the preferred embodiment of the present invention. It should also be understood that other implementations could further use additional criteria and more refined probabilistic algorithms to complement the above anchor and depth analysis.

Once the most probable link to the web author of the web site containing the malformed documents is determined, the notification module 120 attaches the repaired versions of the author's HTML pages, which were generated by the repair module 110, to a report detailing the errors contained in the malformed pages, and forwards the same to the author's email address that was determined by the author search module 115. The notification module 120 enters the notification information into the relational database 130.

During this entire process, the crawling module 100, the validation module 105, the repair module 110, the author search module 115, and the notification module 120 extract and store the following data from the web pages downloaded by the crawling module 100, in a relational database 130:

The annotation information for "mailto" links (anchor-text, etc.) found within the visited document, as entered by the validation module 105.

A listing of the errors found in non-valid pages, as entered by the validation module 105.

The visit information for all the URLs or addresses of the pages visited, as entered by the crawling module 100.

The URLs or addresses of the pages to be visited, as entered by the validation module 105.

The hypertext link relationships among URLs or addresses of pages visited, as entered by the validation module 105.

Repair information proposed by and entered by the repair module 110.

Author information found by and entered by the author search module 115.

Notification information sent to the authors of non-valid web pages, as entered by the notification module 120.

Figure 2:
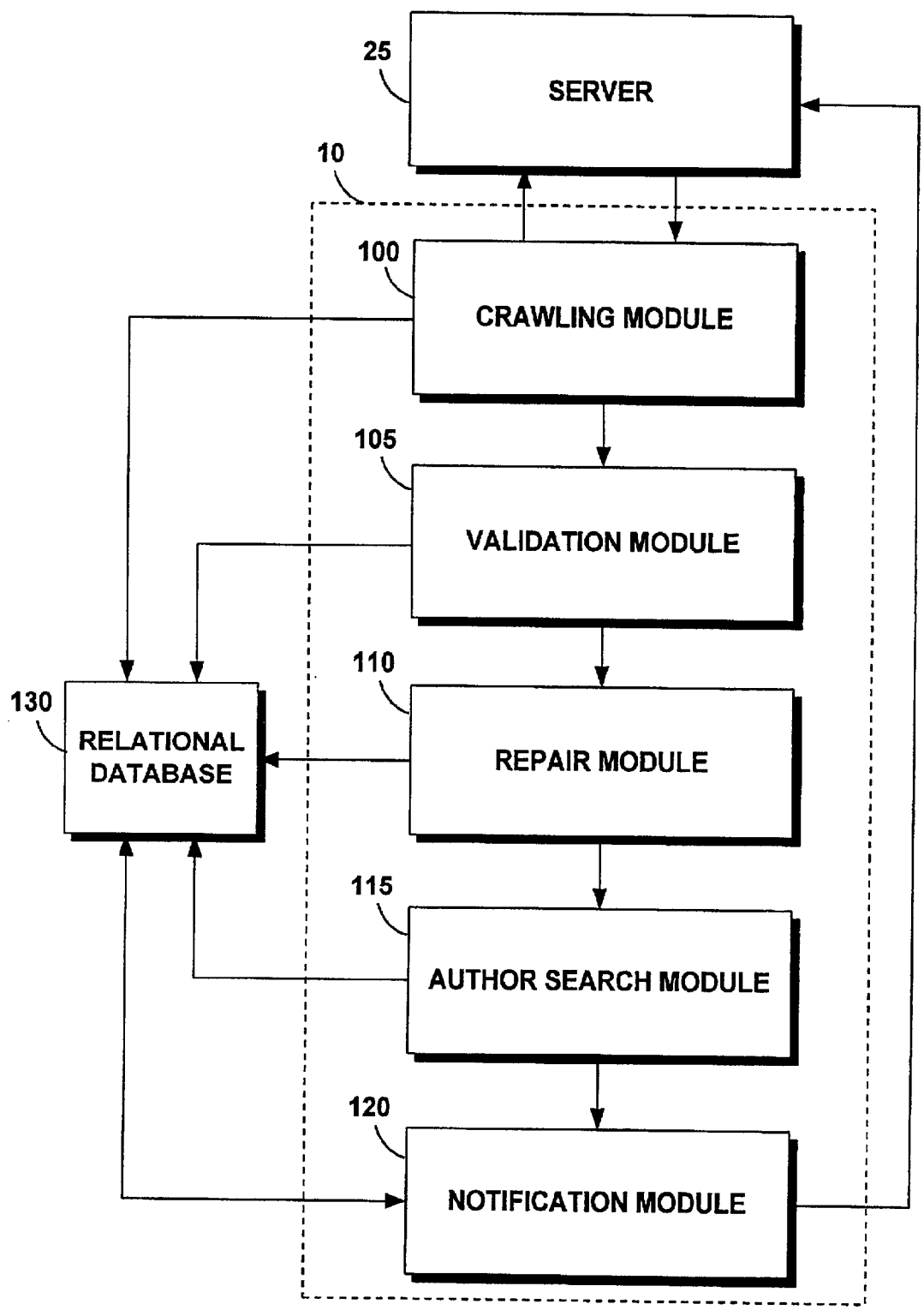
FIG. 2 is a block diagram of a network quality control system of the present invention that provides a WWW quality control system for automatically validating the WWW documents, correcting malformed documents, and notifying persons in charge of maintaining the WWW documents.
Figure 3:
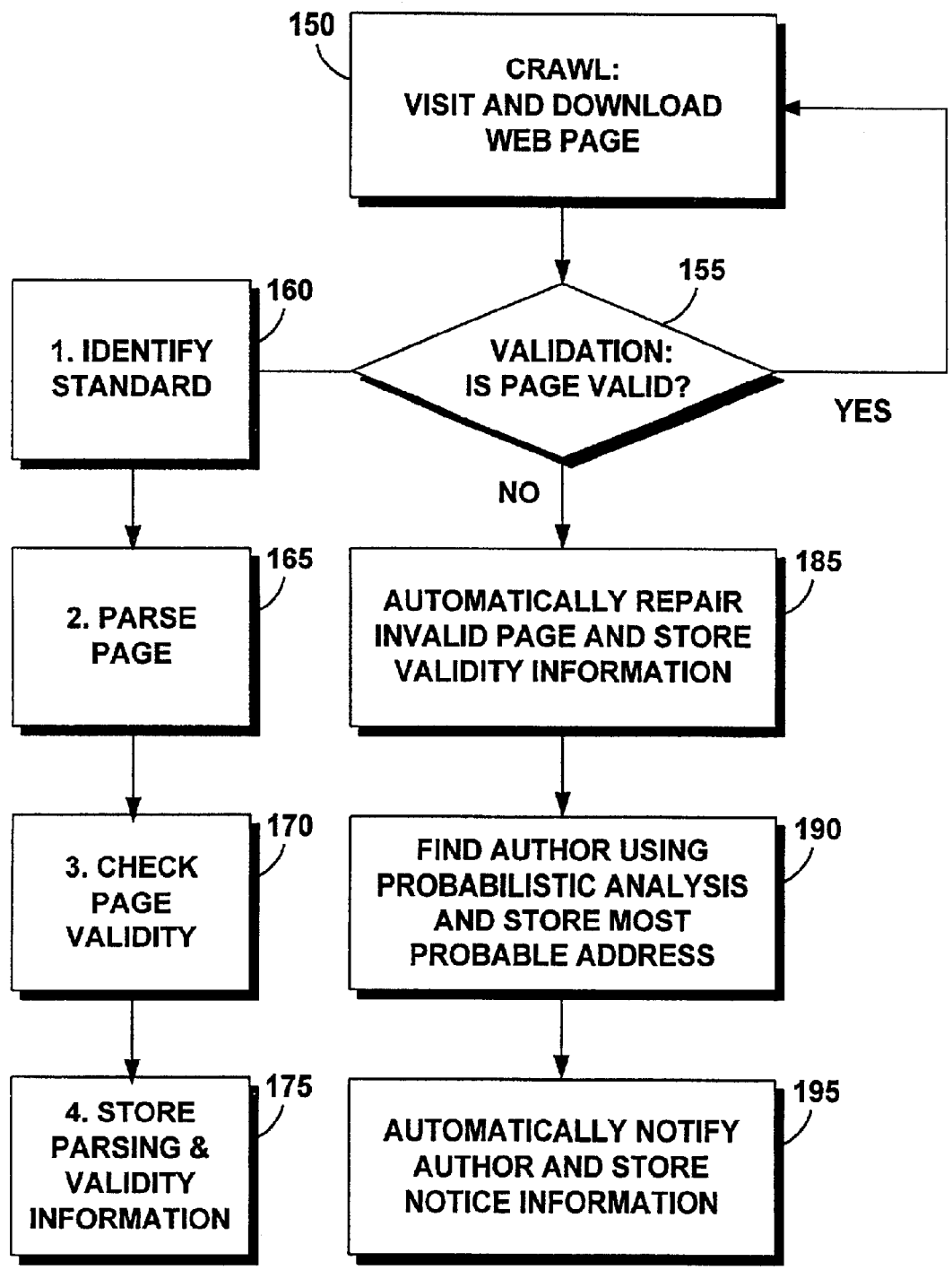
FIG. 3 is a high level flow chart that illustrates the operation of a preferred embodiment of the network quality control system of FIG. 2.

FIG. 3 is a flow chart that illustrates the operation of a preferred embodiment of the NQQ system 10 of FIG. 2. The operation starts at block 150 by having the crawlers system establish a connection to a WWW server and downloading a first HTML web page.

At block or step 155 the validation module 105 automatically validates the downloaded page by identifying the specific hypertext standard used by the page (block 160), parsing the page (block 165) according to the standard specifications, checking the page validity as described herein (block 170), and storing the parsing and validity information in the database 130 (block 175).

If the page is determined to be valid at decision block 155, the routine of crawling and downloading another page is repeated. If, however, the validation module 105 determines that the page is not valid, it outputs and saves the error description, and the repair module 110 automatically attempts to repair the non-valid page using the specifications and recommendations of the page hypertext standard identified at block 160. The repair module 110 stores the validity information in the database 130, as illustrated by block 185.

The author search module 115 automatically applies its heuristic criteria and data gathered by the validation step at block 155, to determine the author identification and contact information as described herein, and stores the most probable contact address in the database 130, as illustrated by block 190.

The notification module 120 automatically sends the analysis and validation recommendation to the page author, such as by e-mail. The routine of crawling and downloading another page to process the next URL (block 150) is repeated.

It is to be understood that the specific embodiment of the invention which has been described above is merely illustrative of one application of the principles of the present invention. Numerous modifications may be made to the network quality control system and associated methods described herein without departing from the spirit and scope of the present invention.

What is claimed is:

1. A network quality control system that performs an automatic validation of hypertext documents, comprising:
   a crawling module for visiting and downloading the hypertext documents to a validation module;
   the validation module identifying a hypertext standard used by the hypertext documents;
   the validation module further automatically testing the validity of the hypertext documents for compliance with the identified standard, by parsing the hypertext documents and by identifying problems it encounters, wherein if a hypertext document fails the parse, the hypertext document is classified as non-conformant, otherwise, the hypertext document is classified as conformant;
   a repair module for automatically correcting non-conformant hypertext documents by passing them through an editor corresponding to the hypertext standard identified by the validation module, by revising non-conformant elements in the hypertext documents;
   an author search module for automatically determining a most probable reply link for the hypertext documents using a probabilistic prediction approach; and
   a notification module for sending a notice to the most probable reply link determined by the author search module.

2. The network quality control system according to claim 1, further including a database;
   wherein the hypertext documents include links to other documents, and the crawling module stores the links in the database; and
   wherein the validation module extracts and stores metadata from the hypertext documents in the database.

3. The network quality control system according to claim 2, wherein the editor includes a HyperText Markup Language (HTML) editor.

4. The network quality control system according to claim 3, wherein the validation module includes a HTML parser that parses HTML documents.

5. The network quality control system according to claim 2, wherein the validation module includes a XML (Extensible Markup Language) parser that parses XML documents.

6. The network quality control system according to claim 2, wherein the metadata includes any one or more of:
   annotation information for "mailto" links found within the visited document, as entered by the validation module;
   a listing of errors found in non-valid pages, as entered by the validation module;
   visit information for addresses of the pages visited, as entered by the crawling module;
   addresses of the pages to be visited, as entered by the validation module;
   hypertext link relationships among the addresses of the pages visited, as entered by the validation module;
   repair information entered by the repair module;
   author information entered by the author search module;
   notification information sent to the authors of non-valid web pages, as entered by the notification module.

7. The network quality control system according to claim 2, wherein the author search module automatically determines the most probable reply link by searching the hypertext documents for metadata that explicitly specifies author information;
   if unsuccessful, the author search module performs a probabilistic analysis of predetermined out-links contained within the hypertext documents; and
   the author search module further computes and assigns a probability score to one or more links, by performing lexical and structure analyses of the links to other documents.

8. The network quality control system according to claim 7, wherein the author search module performs the probabilistic analysis by using one or more of the following probability factors:
   frequency of occurrence of words and phrases in the links;
   frequency of occurrence of words and phrases in the title, description or keyword metadata of the hypertext documents; and
   distribution of depth from a principal hypertext document.

9. The network quality control system according to claim 8, wherein the hypertext documents include World Wide Web pages.

10. A computer program product that performs an automatic validation of hypertext documents, comprising:
    a crawling module for visiting and downloading the hypertext documents to a validation module;
    the validation module identifying a hypertext standard used by the hypertext documents;
    the validation module further automatically testing the validity of the hypertext documents for compliance with the identified standard, by parsing the hypertext documents and by identifying problems it encounters, wherein if a hypertext document fails the parse, the hypertext document is classified as non-conformant, otherwise, the hypertext document is classified as conformant;

a repair module for automatically correcting non-conformant hypertext documents by passing them through an editor corresponding to the hypertext standard identified by the validation module, by revising non-conformant elements in the hypertext documents;

an author search module for automatically determining a most probable reply link for the hypertext documents using a probabilistic prediction approach; and a notification module for sending a notice to the most probable reply link determined by the author search module.

11. The computer program product according to claim 10, further including a database;

wherein the hypertext documents include links to other documents, and the crawling module stores the links in the database;

wherein the validation module extracts and stores metadata from the hypertext documents in the database.

12. The computer program product according to claim 11, wherein the editor includes a HyperText Markup Language (HTML) editor; and wherein the validation module includes a HTML parser that parses HTML documents.

13. The computer program product according to claim 11, wherein the metadata includes any one or more of:

annotation information for "mailto" links found within the visited document, as entered by the validation module;

a listing of errors found in non-valid pages, as entered by the validation module;

visit information for addresses of the pages visited, as entered by the crawling module;

addresses of the pages to be visited, as entered by the validation module;

hypertext link relationships among the addresses of the pages visited, as entered by the validation module;

repair information entered by the repair module;

author information entered by the author search module;

notification information sent to the authors of non-valid web pages, as entered by the notification module.

14. The computer program product according to claim 11, wherein the author search module automatically determines the most probable reply link by searching the hypertext documents for metadata that explicitly specifies author information;

if unsuccessful, the author search module performs a probabilistic analysis of predetermined out-links contained within the hypertext documents; and the author search module further computes and assigns a probability score to one or more links, by performing lexical and structure analyses of the links to other documents.

15. The computer program product according to claim 14, wherein the author search module performs the probabilistic analysis by using one or more of the following probability factors:

frequency of occurrence of words and phrases in the links;

frequency of occurrence of words and phrases in the title, description or keyword metadata of the hypertext documents; and distribution of depth from a principal hypertext document.

16. A method of performing an automatic validation of hypertext documents, comprising:

a crawling module visiting and downloading the hypertext documents to a validation module;

the validation module identifying a hypertext standard used by the hypertext documents, and automatically testing the validity of the hypertext documents for compliance with the identified standard, by parsing the hypertext documents and by identifying problems it encounters, wherein if a hypertext document fails the parse, the hypertext document is classified as non-conformant, otherwise, the hypertext document is classified as conformant;

a repair module automatically correcting non-conformant hypertext documents by passing them through an editor corresponding to the hypertext standard identified by the validation module, by revising non-conformant elements in the hypertext documents;

an author search module automatically determining a most probable reply link for the hypertext documents using a probabilistic prediction approach; and a notification module sending a notice to the most probable reply link determined by the author search module.

17. The method according to claim 16, wherein the hypertext documents include links to other documents, and further including:

storing the links in the database; and extracting and storing metadata from the non-conformant hypertext documents in the database.

18. The method according to claim 17, wherein parsing the hypertext documents includes using a HyperText Markup Language (HTML) editor for parsing HTML documents.

19. The method according to claim 18, wherein storing metadata includes storing any one or more of the following factors:

annotation information for "mailto" links found within the visited document, as entered by the validation module;

a listing of errors found in non-valid pages, as entered by the validation module;

visit information for addresses of the pages visited, as entered by the crawling module;

addresses of the pages to be visited, as entered by the validation module;

hypertext link relationships among the addresses of the pages visited, as entered by the validation module;

repair information entered by the repair module;

author information entered by the author search module;

notification information sent to the authors of non-valid web pages, as entered by the notification module.

20. The method according to claim 18, wherein the author search module automatically determines the most probable reply link by searching the hypertext documents for metadata that explicitly specifies author information;

if unsuccessful, performing a probabilistic analysis of predetermined out-links contained within the hypertext documents; and further computing and assigning a probability score to one or more links, by performing lexical and structure analyses of the links to other documents.

21. The method according to claim 20, wherein performing the probabilistic analysis includes using one or more of the following probability factors:

frequency of occurrence of words and phrases in the links;

frequency of occurrence of words and phrases in the title, description or keyword metadata of the hypertext documents; and distribution of depth from a principal hypertext document.

22. The method according to claim 16, wherein the hypertext documents comprise XML documents; and further comprising parsing the XML documents.

23. A computer program product having instruction codes that performs an automatic validation of hypertext documents, comprising:

a first set of instruction codes for visiting and downloading the hypertext documents;

a second set of instruction codes identifying a hypertext standard used by the hypertext documents;

the second set of instruction codes further automatically testing the validity of the hypertext documents for compliance with the identified standard, by parsing the hypertext documents and by identifying problems it encounters, wherein if a hypertext document fails the parse, the hypertext document is classified as non-conformant, otherwise, the hypertext document is classified as conformant;

a third set of instruction codes for automatically correcting non-conformant hypertext documents by passing them through an editor corresponding to the hypertext standard identified by the second set of instruction codes, by revising non-conformant elements in the hypertext documents;

a fourth set of instruction codes for automatically determining a most probable reply link for the hypertext documents using a probabilistic prediction approach; and a fifth set of instruction codes for sending a notice to the most probable reply link determined by the fourth set of instruction codes.

24. The computer program product according to claim 23, further comprising a database;

wherein the hypertext documents comprise links to other documents, and the first set of instruction codes stores the links in the database; and wherein the second set of instruction codes extracts and stores metadata from the hypertext documents in the database.

25. The computer program product according to claim 24, wherein the hypertext documents comprise HTML documents; and wherein the second set of instruction codes parses the HTML documents.

26. The computer program product according to claim 24, wherein the metadata includes any one or more of:

annotation information for "mailto" links found within the visited document;

a listing of errors found in non-valid pages;

visit information for addresses of the pages visited;

addresses of the pages to be visited;

hypertext link relationships among the addresses of the pages visited;

repair information;

author information; and notification information.

27. The computer program product according to claim 24, wherein the fourth set of instruction codes automatically determines the most probable reply link by searching the hypertext documents for metadata that explicitly specifies author information;

if unsuccessful, the fourth set of instruction codes performs a probabilistic analysis of predetermined out-links contained within the hypertext documents; and the fourth set of instruction codes further computes and assigns a probability score to one or more links, by performing lexical and structure analyses of the links to other documents.

28. The computer program product according to claim 27, wherein the fourth set of instruction codes performs the probabilistic analysis by using one or more of the following probability factors:

frequency of occurrence of words and phrases in the links;

frequency of occurrence of words and phrases in the title, description or keyword metadata of the hypertext documents; and distribution of depth from a principal hypertext document.

29. The method according to claim 23, wherein the hypertext documents comprise XML documents; and further comprising parsing the XML documents.

30. A computer program product that performs an automatic validation of hypertext documents, comprising:

means for visiting and downloading the hypertext documents;

means for identifying a hypertext standard used by the hypertext documents;

means for automatically testing the validity of the hypertext documents for compliance with the identified standard, by parsing the hypertext documents and by identifying problems it encounters, wherein if a hypertext document fails the parse, the hypertext document is classified as non-conformant, otherwise, the hypertext document is classified as conformant;

means for automatically correcting non-conformant hypertext documents by passing them through an editor corresponding to the identified hypertext standard, by revising non-conformant elements in the hypertext documents;

means for automatically determining a most probable reply link for the hypertext documents using a probabilistic prediction approach; and means for sending a notice to the most probable reply link.

* * * * *